(12) United States Patent
Morita

(10) Patent No.: US 12,065,091 B2
(45) Date of Patent: Aug. 20, 2024

(54) POWER SUPPLY SYSTEM

(71) Applicant: DENSO CORPORATION, Kariya (JP)

(72) Inventor: Tetsuo Morita, Kariya (JP)

(73) Assignee: DENSO CORPORATION, Kariya (JP)

(*) Notice: Subject to any disclaimer, the term of this patent is extended or adjusted under 35 U.S.C. 154(b) by 353 days.

(21) Appl. No.: 17/550,704

(22) Filed: Dec. 14, 2021

(65) Prior Publication Data

US 2022/0097634 A1 Mar. 31, 2022

Related U.S. Application Data

(63) Continuation of application No. PCT/JP2020/023324, filed on Jun. 15, 2020.

(30) Foreign Application Priority Data

Jul. 26, 2019 (JP) .................. 2019-138147

(51) Int. Cl.
*B60R 16/033* (2006.01)
*H02H 7/18* (2006.01)
*H02J 1/08* (2006.01)
*H02J 7/14* (2006.01)

(52) U.S. Cl.
CPC .......... *B60R 16/033* (2013.01); *H02H 7/18* (2013.01); *H02J 1/08* (2013.01); *H02J 7/1423* (2013.01); *H02J 7/1438* (2013.01); *H02J 2207/10* (2020.01); *H02J 2310/40* (2020.01)

(58) Field of Classification Search
None
See application file for complete search history.

(56) References Cited

U.S. PATENT DOCUMENTS

| | | | |
|---|---|---|---|
| 2018/0001850 A1 | 1/2018 | Kontani | |
| 2018/0370465 A1* | 12/2018 | Sato | ............. B60R 16/033 |
| 2020/0216002 A1 | 7/2020 | Mazaki et al. | |
| 2021/0402939 A1* | 12/2021 | Obayashi | ............. H02J 7/0063 |

FOREIGN PATENT DOCUMENTS

JP 2018-182864 A 11/2018

* cited by examiner

*Primary Examiner* — Jared Fureman
*Assistant Examiner* — Aqeel H Bukhari
(74) *Attorney, Agent, or Firm* — Oliff PLC

(57) ABSTRACT

A power supply system includes a first power output portion, a second power output portion, and a ring-form main pathway. A power supply system includes a first output pathway connecting the main pathway with the first power output portion, a second output pathway connecting the main pathway with the second power output portion, and a loading pathway connecting the main pathway with an electric load. The power supply system includes multiple main switches and a control unit. The main switch is configured to switch between a ring connection state and a non-ring connection state of the main pathway. The control unit controls the switching of the main switch. The control unit is configured to activate a non-ring connection mode that turns off one of the main switches and turns on the remainder of the main switches.

8 Claims, 10 Drawing Sheets

POWER SUPPLY SYSTEM

CROSS REFERENCE TO RELATED APPLICATION

The present application is a continuation application of International Patent Application No. PCT/JP2020/023324 filed on Jun. 15, 2020, which designated the U.S. and claims the benefit of priority from Japanese Patent Application No. 2019-138147 filed on Jul. 26, 2019. The entire disclosures of all of the above applications are incorporated herein by reference.

TECHNICAL FIELD

The present disclosure in this specification relates to a power supply system.

BACKGROUND

Conventionally, a power supply system includes an inter-system switch configured to connect main pathways of multiple power systems in a ring form.

SUMMARY

According to an aspect of the present disclosure, a power supply system comprises a first power output portion configured to output electric power supplied to an electric load; a second power output portion different from the first power output portion and configured to output electric power supplied to the electric load; a main pathway in a ring form and configured to provide a current pathway to enable flow of a current output from the first power output portion and a current output from the second power output portion; a first output pathway connecting the main pathway with the first power output portion; a second output pathway connecting the main pathway with the second power output portion; a loading pathway connecting the main pathway with the electric load; and a plurality of main switches provided to the main pathway.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
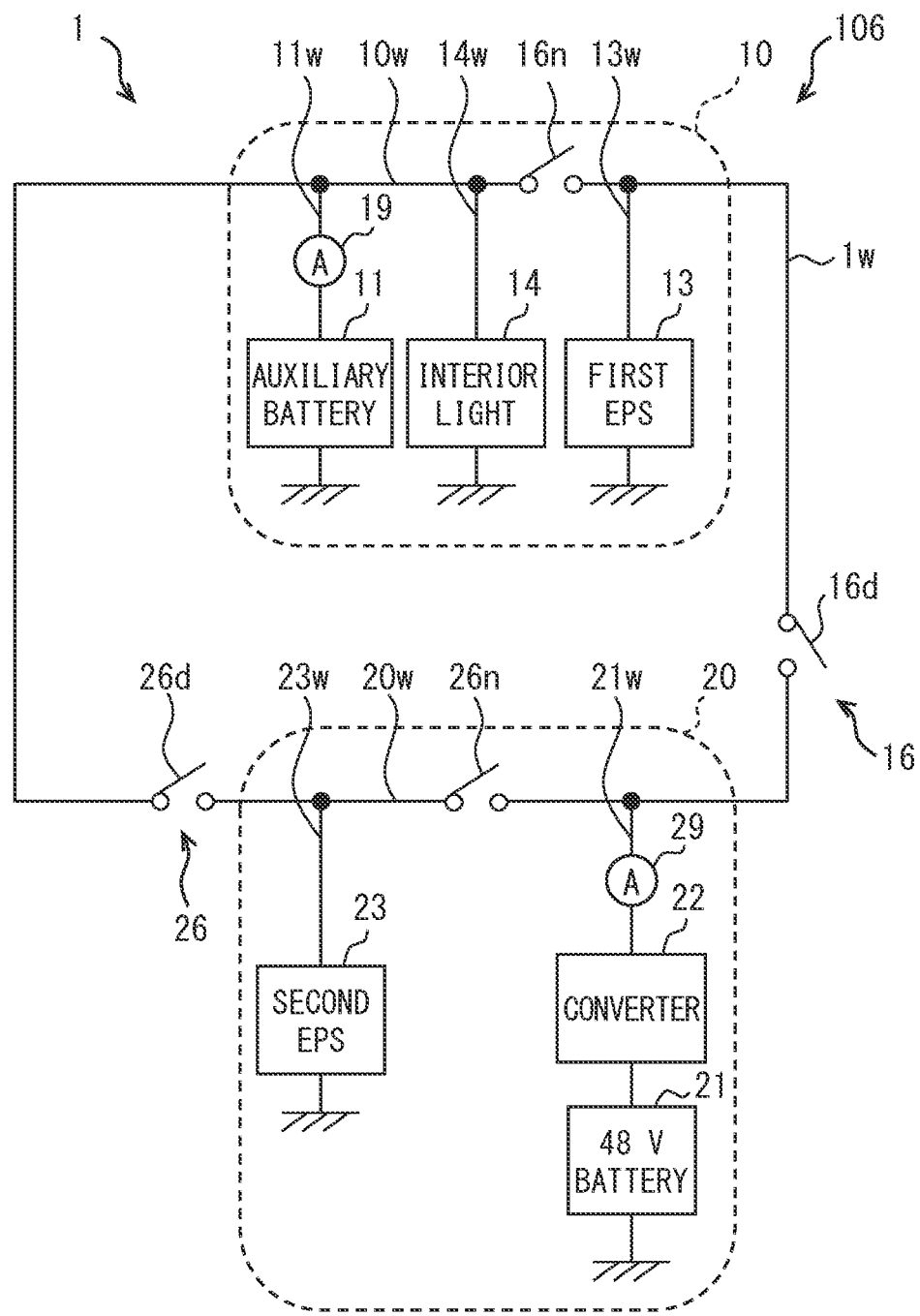
FIG. 1 is a diagram showing a schematic configuration of a power supply system.

Hereinafter, examples of the present disclosure will be described.

According to an example of the present disclosure, a power supply system allows an inter-system switch to connect main pathways of multiple power systems in a ring form. In terms of the multiple power systems, a malfunctioning power system is separated from the other power systems. Alternatively, a power output portion is disconnected from an electric load in the malfunctioning power system.

In this configuration, the main pathways of the power supply system are connected in a ring form when no abnormality occurs.

An assumable configuration employing the ring form may require to change at least two switches from the on-state to the off-state when two power systems need to be separated. In this assumable configuration, the separation between the power systems may not complete until the states of the multiple switches are changed completely.

According to an example of the present disclosure, a power supply system comprises a first power output portion configured to output electric power supplied to an electric load; a second power output portion different from the first power output portion and configured to output electric power supplied to the electric load; a main pathway in a ring form and configured to provide a current pathway to enable flow of a current output from the first power output portion and a current output from the second power output portion; a first output pathway connecting the main pathway with the first power output portion; a second output pathway connecting the main pathway with the second power output portion; a loading pathway connecting the main pathway with the electric load; a plurality of main switches provided to the main pathway and configured to switch between a state, in which the main pathway is connected in the ring form, and a state, in which the main pathway is not connected in the ring form; and a control unit configured to control switching of the main switches. The control unit is configured to activate a non-ring connection mode that turns off one of the main switches and turns on a remainder of the main switches.

The disclosed power supply system includes a control unit configured to activate the non-ring connection mode that turns off one of the main switches and turns on the remainder of the main switches. When the power system malfunctions, one of the on-state switches may be turned off to turn off two of the main switches thereby to separate the power system. Alternatively, an off-state switch can be turned on to turn on all main switches and enable a ring connection of the main pathway. Therefore, it is possible to provide the power supply system that enables to smoothly switch the connection states of the ring-form main pathway.

The description below explains embodiments of the present disclosure with reference to the accompanying drawings. Functionally and/or structurally corresponding and/or associated parts in the embodiments may be designated by the same reference numerals or those differing in digits higher than or equal to the hundreds place. The description of the other embodiments can be referenced for the corresponding and/or associated parts.

First Embodiment

A power supply system 1 supplies electric power to a device including multiple electric loads driven by electric power. The power supply system 1 can be mounted on movable objects such as automobiles that travel by using a power plant such as an engine or a traveling motor. The description below explains cases where the power supply system 1 is installed on an automobile. The movable objects are not limited to vehicles such as automobiles or two-wheeled vehicles but may also include ships, aircraft, and transportation devices, for example. The power supply system 1 may be used as a stationary system instead of being mounted on movable objects.

In FIG. 1, the power supply system 1 includes two power output portions, namely, an auxiliary battery 11 and a 48V battery 21. The auxiliary battery 11 and the 48V battery 21 store electric power supplied to electric loads. The auxiliary battery 11 and the 48V battery 21 are DC voltage sources that can be charged and discharged. The auxiliary battery 11 has a rated voltage of 12 V, for example. The 48V battery 21 has a rated voltage of 48V higher than that of the auxiliary battery 11. Secondary batteries such as lead batteries, nickel hydride batteries, and lithium-ion batteries, and capacitors can be used as the auxiliary battery 11 and the 48V battery 21. The auxiliary battery 11 exemplifies a power output portion and a first power output portion. The 48V battery 21 exemplifies a power output portion and a second power output portion. The power output portions such as the first power output portion and the second power output portion may be any devices configured to output electric power. Therefore, the power output portions can use generators such as rotating electrical machines that generate electricity using batteries of various voltages or driving forces of gasoline engines.

The power supply system 1 includes a main pathway 1w, a first output pathway 11w, and a second output pathway 21w. The main pathway 1w configures a ring-form current pathway. The main pathway 1w need not always form a ring-form current pathway and may be a current pathway capable of ring connection. The first output pathway 11w and the second output pathway 21w are current pathways connected to the main pathway 1w. The first output pathway 11w connects the main pathway 1w and the auxiliary battery 11. The first output pathway 11w includes a first current sensor 19. The first current sensor 19 measures the magnitude of current output from the auxiliary battery 11.

The second output pathway 21w connects the main pathway 1w and the 48V battery 21. The second output pathway 21w includes a converter 22 and a second current sensor 29. The converter 22 steps down a 48V DC voltage output from the 48V battery 21 to 12 V equal to an output voltage of the auxiliary battery 11. The second current sensor 29 measures the magnitude of current that is output from the 48V battery 21 and is stepped down by the converter 22.

The first current sensor 19 and the second current sensor 29 can use an ammeter that measures current values by measuring voltages at both ends of a resistor. It is also possible to use a magneto-electric converting device that converts magnetic fields in a Hall element, for example, into electric currents. The magneto-electric converting device is configured to measure the magnitude of current in a non-contact manner.

The main pathway 1w includes two current pathways, namely, a first main pathway 10w and a second main pathway 20w. The first main pathway 10w connects the first output pathway 11w and the second output pathway 21w. The second main pathway 20w is a current pathway different from the first main pathway 10w and connects the first output pathway 11w and the second output pathway 21w. In other words, the main pathway 1w includes the first main pathway 10w that provides a current pathway clockwise from the first output pathway 11w to the second output pathway 21w. Meanwhile, the main pathway 1w includes the second main pathway 20w that provides a current pathway counterclockwise from the first output pathway 11w to the second output pathway 21w.

The power supply system 1 includes a first loading pathway 13w, a second loading pathway 23w, and a general loading pathway 14w. The first loading pathway 13w connects the main pathway 1w and a first electric power steering device 13. Hereinafter, the first electric power steering device 13 may be referred to as a first EPS 13. The second loading pathway 23w connects the main pathway 1w and a second electric power steering device 23. Hereinafter, the second electric power steering device 23 may be referred to as a second EPS 23.

The first EPS 13 and the second EPS 23 are loads each including a motor that assists the steering force. The first EPS 13 and the second EPS 23 are loads that require being supplied with a stable voltage. The stable voltage signifies a voltage within the guaranteed operating range of voltage to continue intended operations. The first EPS 13 and the second EPS 23 form a set of electric power steering systems. The electric power steering system needs to continue operating even if the power supplies are partly lost. The first EPS 13 and the second EPS 23 are redundant loads. Even if one of them fails, the other can be used to function as the electric power steering system. The redundant loads form not only the redundant power supply pathway but also the redundant electric power steering system.

The first EPS 13 and the second EPS 23 belong to redundant traveling loads that mutually complement functions required to travel a vehicle such as running, turning, and stopping. The redundant traveling load is not limited to the electric power steering system. The redundant traveling load can include a camera device to provide a perimeter monitoring function, for example. The redundant traveling load may include a braking device that provides stop and deceleration functions, for example. The redundant traveling load may include lighting systems such as hazard lights and headlamps, for example. The first EPS 13 exemplifies an electric load and a first electric load. The second EPS 23 exemplifies an electric load and a second electric load.

When only one of the first EPS 13 and the second EPS 23 as loads functions properly, the steering performance is lower than a case of properly functioning both the first EPS 13 and the second EPS 23 as loads. Normally, the use of both the first EPS 13 and the second EPS 23 as loads maintains the steering performance in good condition. The first EPS 13 and the second EPS 23 are loads that do not require the power supply when the power plant is not driven. These loads require the power supply when the power plant is driven to enable the travel.

The general loading pathway 14w connects the main pathway 1w and an interior light 14. The interior light 14 is a load that illuminates the space inside the vehicle. The interior light 14 differs from the functions required for vehicle travel such as an electric power steering function and a braking function. The interior light 14 provides the load belonging to a general load that enables the vehicle to continue traveling even if a malfunction occurs. In addition to the interior light 14, the general load includes loads such as an air conditioner, a seat heater, an electric suspension, and a power window. The general load may be connected between the 48V battery 21 and the converter 22 in the second output pathway 21w. It is possible to apply different voltages to the general loads by applying a voltage of 48V to the air conditioner and a voltage of 12 V to the interior light 14, for example.

The first main pathway 10w includes a first main switch 16. The first main switch 16 includes two switches, namely, a first proximity switch 16n and a first remote switch 16d. The first proximity switch 16n is provided between the first output pathway 11w and the first loading pathway 13w in the first main pathway 10w. The first remote switch 16d is provided between the first loading pathway 13w and the second output pathway 21w in the first main pathway 10w.

When the first proximity switch 16n is turned on, electric power is supplied from the auxiliary battery 11 to the first EPS 13 through the use of the first main pathway 10w as the current pathway. When the first proximity switch 16n is turned off, no electric power is supplied from the auxiliary battery 11 to the first EPS 13 through the use of the first main pathway 10w as the current pathway. Meanwhile, the on/off-state of the first remote switch 16d does not affect the power supply from the auxiliary battery 11 to the first EPS 13 through the use of the first main pathway 10w as the current pathway.

The second main pathway 20w includes a second main switch 26. The second main switch 26 includes two switches, namely, a second proximity switch 26n and a second remote switch 26d. The second proximity switch 26n is provided between the second output pathway 21w and the second loading pathway 23w in the second main pathway 20w. The second remote switch 26d is provided between the second loading pathway 23w and the first output pathway 11w in the second main pathway 20w.

When the second proximity switch 26n is turned on, electric power is supplied from the 48V battery 21 to the second EPS 23 through the use of the second main pathway 20w as the current pathway. When the second proximity switch 26n is turned off, no electric power is supplied from the 48V battery 21 to the second EPS 23 through the use of the second main pathway 20w as the current pathway. Meanwhile, the on/off-state of the second remote switch 26d does not affect the power supply from the 48V battery 21 to the second EPS 23 through the use of the second main pathway 20w as the current pathway.

The first proximity switch 16n, the first remote switch 16d, the second proximity switch 26n, and the second remote switch 26d switch between connection and disconnection states of the current pathway in the main pathway 1w. In other words, the first proximity switch 16n, the first remote switch 16d, the second proximity switch 26n, and the second remote switch 26d form a main switch 106. The switches of the main switch 106 are also referred to as isolators.

The main switch 106 may use a mechanical relay having contacts, for example. The main switch 106 may use a semiconductor switch such as MOSFET or IGBT having no mechanical contacts, for example. When the main switch 106 uses a semiconductor switch, two MOSFETs may be connected in series to form one main switch 106, for example. Two adjacent main switches 106 may be regarded as one main switch 106 when no load or power output portion is provided between the two adjacent main switches 106. The main switch 106 using a semiconductor switch is capable of faster switching control than a mechanical relay.

In the present disclosure, the first proximity switch 16n, the first remote switch 16d, the second proximity switch 26n, and the second remote switch 26d may be referred to as the main switch 106. In addition, two or more of the first proximity switch 16n, the first remote switch 16d, the second proximity switch 26n, and the second remote switch 26d may be referred to as multiple main switches 106.

The auxiliary battery 11, the first EPS 13, and the interior light 14 form a first power system 10. The first power system 10 includes the current pathway composed of part of the main pathway 1w, the first output pathway 11w, the first loading pathway 13w, and the general loading pathway 14w. The first power system 10 can supply electric power to the first EPS 13 using the auxiliary battery 11. However, the configuration of the first power system 10 is not limited to this example.

The 48V battery 21 and the second EPS 23 form a second power system 20. The second power system 20 includes the current pathway composed of part of the main pathway 1w, the second output pathway 21w, and the second loading pathway 23w. The second power system 20 can supply electric power to the second EPS 23 using the 48V battery 21. However, the configuration of the second power system 20 is not limited to this example.

When the first remote switch 16d is turned on, electric power is supplied from the 48V battery 21 to the first EPS 13 through the use of the first main pathway 10w as the current pathway. When the first remote switch 16d is turned off, no electric power is supplied from the 48V battery 21 to the first EPS 13 through the use of the first main pathway 10w as the current pathway. When the second remote switch 26d is turned on, electric power is supplied from the auxiliary battery 11 to the second EPS 23 through the use of the second main pathway 20w as the current pathway. When the second remote switch 26d is turned off, no electric power is supplied from the auxiliary battery 11 to the second EPS 23 through the use of the second main pathway 20w as the current pathway.

The first remote switch 16d and the second remote switch 26d are inter-system switches that switch connection states between different power systems such as the first power system 10 and the second power system 20. Meanwhile, the first proximity switch 16n and the second proximity switch 26n are intra-system switches that switch connection states in one power system. In other words, the first remote switch 16d and the second remote switch 26d are inter-system switches that are turned on to cause a conductive state between adjacent power systems and are turned off to cause a disconnective state between the power systems. The first proximity switch 16n and the second proximity switch 26n are intra-system switches that are turned on to cause a conductive state in one power system and are turned off to cause a disconnective state in the one power system. The conductive state signifies a state capable of energization.

Figure 2:
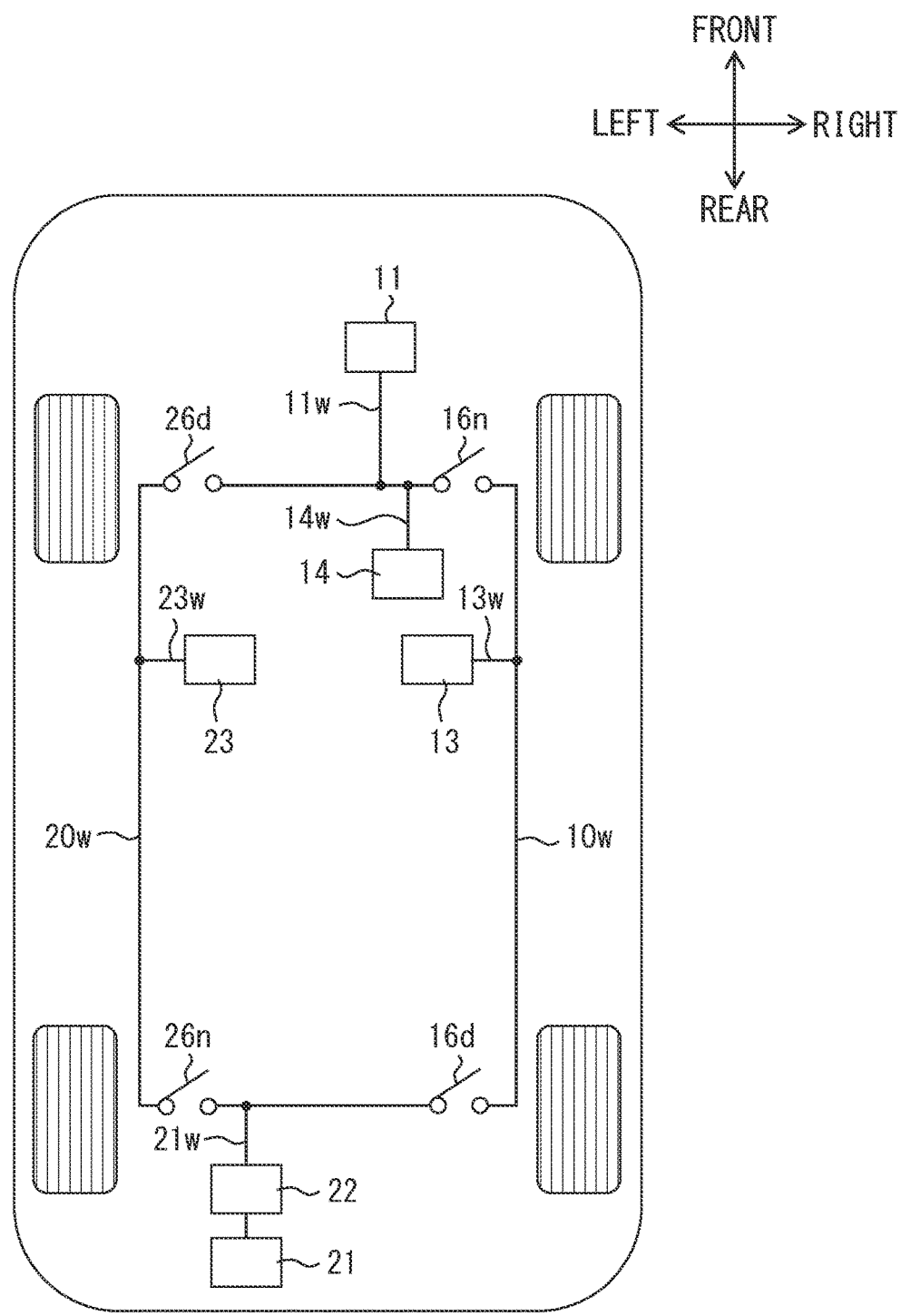
FIG. 2 is a diagram showing a state where the power supply system is mounted on a vehicle.

FIG. 2 illustrates the power supply system 1 mounted on a vehicle. The main pathway 1w is approximately shaped into a rectangular ring. In the longer direction, the main pathway 1w is longer than half of the total length of the vehicle in the longitudinal direction. In the shorter direction, the main pathway 1w is longer than half of the total width of the vehicle in the horizontal direction. The auxiliary battery 11 is provided toward the front and the right of the vehicle. The 48V battery 21 and the converter 22 are provided toward the rear and the left of the vehicle. In other words, the auxiliary battery 11 and the 48V battery 21 are located on the opposite sides in the longitudinal direction of the vehicle. The auxiliary battery 11 and the 48V battery 21 are located on the opposite sides in the horizontal direction of the vehicle. The first EPS 13 and the second EPS 23 are provided toward the front from the center of the vehicle in the longitudinal direction.

The first output pathway 11w connects the main pathway 1w and the auxiliary battery 11 in the shortest distance. The first loading pathway 13w connects the main pathway 1w and the first EPS 13 in the shortest distance. The second output pathway 21w connects the main pathway 1w and the 48V battery 21 in the shortest distance. The second loading pathway 23w connects the main pathway 1w and the second EPS 23 in the shortest distance.

The length of the current pathway from the auxiliary battery 11 to the first EPS 13 is shorter than the length from the auxiliary battery 11 to the second EPS 23. The length of the current pathway from the 48V battery 21 to second EPS 23 is shorter than the length of the current pathway from the 48V battery 21 to the first EPS 13.

Figure 3:
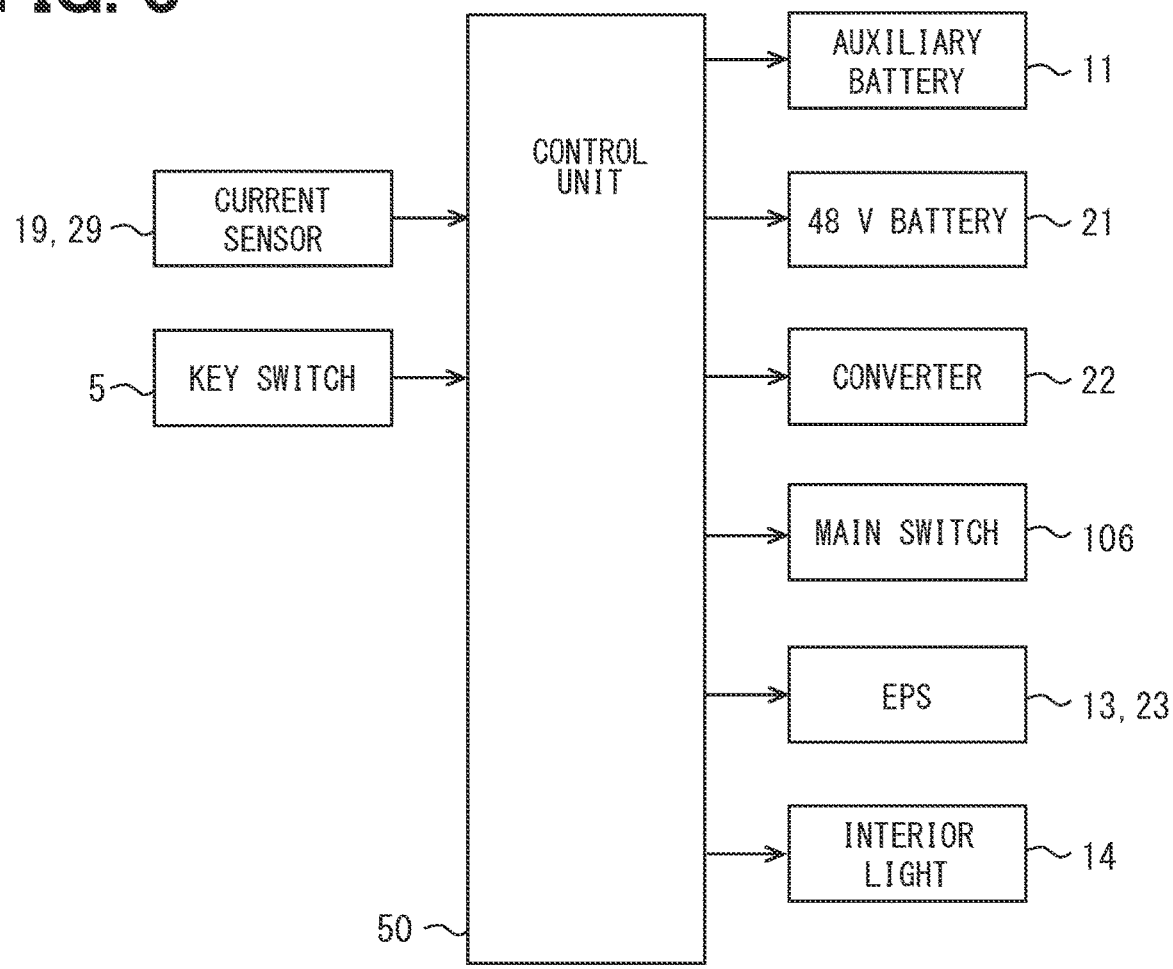
FIG. 3 is a block diagram relevant to controls of the power supply system.

FIG. 3 is a diagram illustrating a control system. The control unit in this specification may also be referred to as an electronic control unit (ECU). The control unit is provided according to (a) an algorithm as multiple logics in the if-then-else form or (b) a learned model tuned by machine learning such as a neural network algorithm.

The control system including at least one computer provides the control unit. The control system may include multiple computers linked by a data communication unit. The computer includes at least one hardware processor as a processor for the hardware. The hardware processor may be provided according to configuration (i), (ii), or (iii) below.

(i) The hardware processor may signify at least one processor core that executes a program stored in at least one memory unit. In this case, the computer is provided in the form of at least one memory unit and at least one processor core. The processor core is referred to as CPU (Central Processing Unit), GPU (Graphics Processing Unit), or RISC-CPU, for example. Memory is also referred to as a storage medium. The memory is a non-transitory tangible storage medium that permanently stores processor-readable "programs and/or data" that may be read by a processor. The storage medium is provided in the form of semiconductor memory, magnetic disks, and optical disks, for example. The program may be distributed alone or in the form of a storage medium in which the program is stored.

(ii) The hardware processor may represent a hardware logic circuit. In this case, the computer is provided in the form of a digital circuitry that includes a large number of programmed logic units (gate circuits). The digital circuitry is also referred to as a logic circuit array such as Application-Specific Integrated Circuit (ASIC), Field Programmable Gate Array (FPGA), Programmable Gate Array (PGA), or Complex Programmable Logic Device (CPLD). The digital circuitry may include memory that stores programs and/or data. The computer may be provided in the form of analog circuitry. The computer may be provided as a combination of digital and analog circuitries.

(iii) The hardware processor may be a combination of configurations (i) and (ii) above. Configurations (i) and (ii) are placed on different chips or a common chip. In these cases, configuration (ii) is also referred to as an accelerator.

The control unit, signal sources, and control targets provide various elements. At least part of the elements may be referred to as a block, module, or section. An element included in the control system is referred to as a functional means only when the element is used intentionally.

A control unit and the technique thereof described in this disclosure may be actualized by a dedicated computer that is provided by configuring memory and a processor programmed to perform one or more functions embodied by a computer program. Further, the control unit and the technique thereof described in this disclosure may be actualized by a dedicated computer that is provided by configuring a processor through the use of one or more dedicated hardware logic circuits. Moreover, the control unit and the technique thereof described in this disclosure may be actualized by one or more dedicated computers each configured by a combination of memory, a processor programmed to perform one or more functions, and a processor composed of one or more hardware logic circuits. Furthermore, the computer program may be provided as an instruction executed by the computer and may be stored in a computer-readable non-transitional tangible recording medium.

In FIG. 3, a control unit 50 is connected to the first current sensor 19, the second current sensor 29, and a key switch 5. The key switch 5 is manipulated by an occupant to switch between a state capable of vehicle travel and a state incapable of vehicle travel. The control unit 50 acquires a current value measured by the first current sensor 19. The control unit 50 acquires a current value measured by the second current sensor 29. The control unit 50 acquires information about occupant's manipulation on the key switch 5. More specifically, the control unit 50 acquires information on whether the key switch 5 maintains off-state, accessory state, or ignition state.

The control unit 50 is connected to the auxiliary battery 11, the 48V battery 21, and the converter 22. The control unit 50 controls charge and discharge of the auxiliary battery 11 to keep the electric storage quantity within an appropriate range. The control unit 50 controls charge and discharge of the 48V battery 21 to keep the electric storage quantity within an appropriate range. The control unit 50 controls the converter 22 to step down an output voltage from the 48V battery 21 to 12 V equal to an output voltage from the auxiliary battery 11.

The control unit 50 is connected to the main switch 106. In other words, the control unit 50 is connected to the first proximity switch 16n, the first remote switch 16d, the second proximity switch 26n, and the second remote switch 26d. The control unit 50 switches between the on-state and the off-state of the main switch 106 based on information such as current values acquired by using the first current sensor 19 or the second current sensor 29.

The first remote switch 16d provides a faster cutoff response speed than the other main switches 106. The first remote switch 16d is provided with advanced noise control measures, achieving both high cutoff response speed and stable operation with few malfunctions. The first remote switch 16d preferably provides the cutoff response speed of several tens of microseconds. However, all the main switches 106 may provide the same cutoff response speed.

The control unit 50 is connected to the first EPS 13, the second EPS 23, and the interior light 14. The control unit 50 drives the first EPS 13 and the second EPS 23 to function as the electric power steering system. The control unit 50 controls the interior light 14 to control the lighting inside the vehicle interior.

Figure 4:
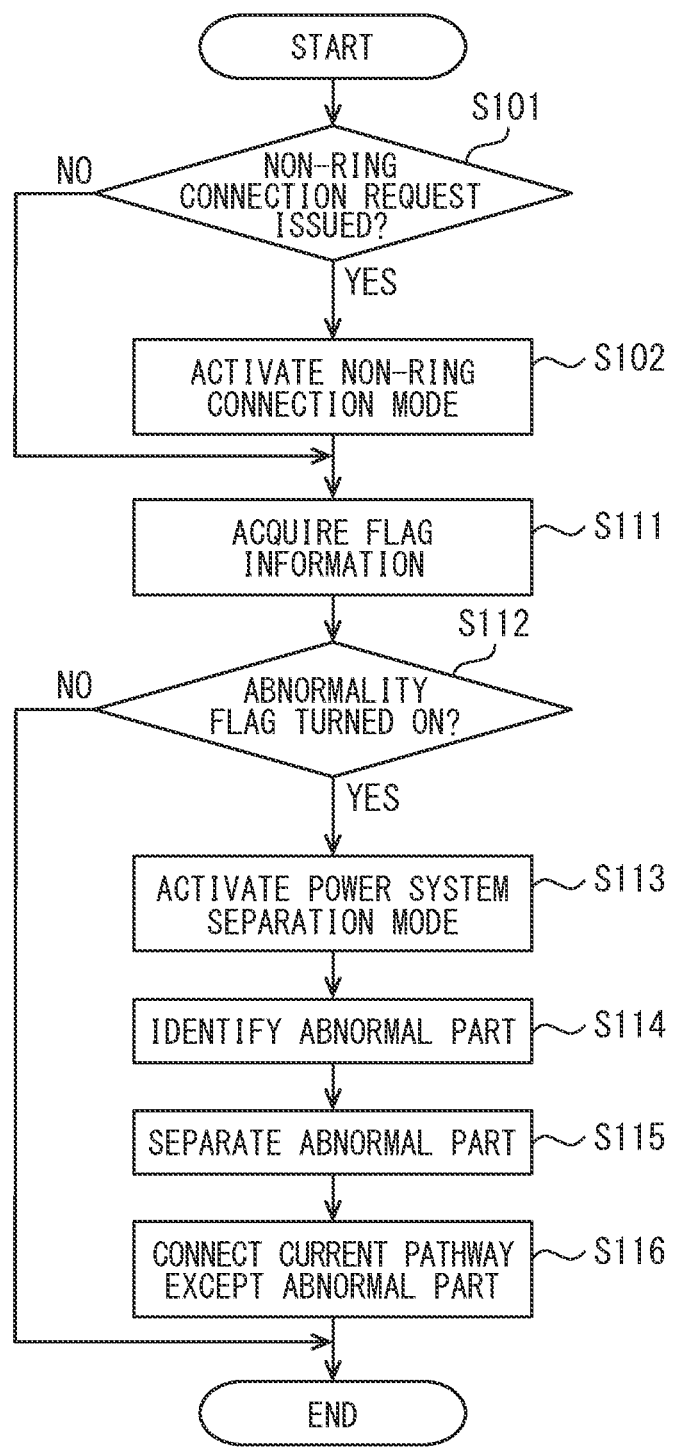
FIG. 4 is a flowchart showing controls of the power supply system.

In FIG. 4, the power supply system 1 starts driving to start the switching control over the main switch 106. Then, at step S101, the process determines whether a non-ring connection request is issued. The non-ring connection request provides information to determine whether to activate a non-ring connection mode. If the non-ring connection request is issued, the process proceeds to step S102. If the non-ring connection request is not issued, the process proceeds to step S111.

For example, the non-ring connection request is issued in a driving assistance mode in which the vehicle assists the occupant in driving. The non-ring connection request is issued in an automatic operation mode in which the vehicle travels independently of the occupant's operation. The non-ring connection request is issued in an abnormality detection mode that detects the presence or absence of an abnormality in the power supply system 1. The non-ring connection request is issued in a noise reduction mode that reduces the noise generated from the power supply system 1. The non-ring connection request is issued when the user manipulates a manipulation portion to activate the non-ring connection mode, However, the non-ring connection request may need not be always issued under the above-described conditions. In other words, the non-ring connection request may be temporarily not issued when the non-ring connection mode is continuously activated for a predetermined time, as will be described later. For example, the main pathway 1w may be connected in a ring form during the abnormality detection mode to detect the presence or absence of an abnormality in the main switch 106 or the main pathway 1w. In such a case, the non-ring connection request may be temporarily not issued.

The abnormality detection mode includes a control to successively turn on and off the main switches 106 one by one to check the operation of the main switches 106, for example. The abnormality detection mode includes a control to determine whether current values measured by the first current sensor 19 or the second current sensor 29 are normal, for example. The abnormality detection mode includes a control to determine whether a connected electric load is normally supplied with electric power and driven, for example. When activating the automatic operation mode, it is preferable to activate the abnormality detection mode before the automatic operation mode to confirm that the entire power supply system 1 is normal.

Figure 5:
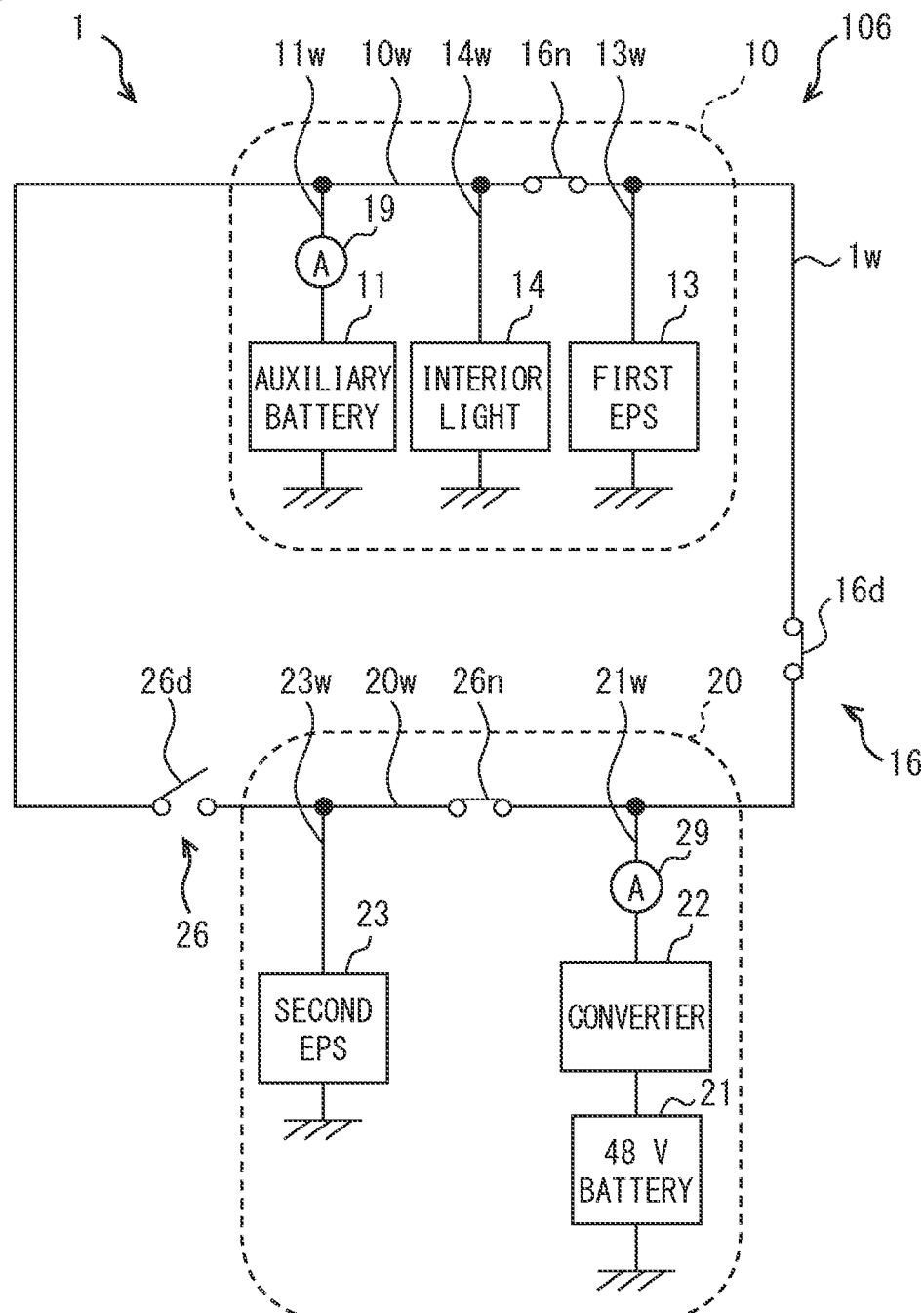
FIG. 5 is a diagram showing on/off-states of main switches in a non-ring connection mode.

At step S102, the process activates the non-ring connection mode. FIG. 5 illustrates the power supply system 1 in the non-ring connection mode. The non-ring connection mode turns on three switches, namely, the first proximity switch 16n, the first remote switch 16d, and the second proximity switch 26n. The second remote switch 26d remains off. The non-ring connection mode prevents the main pathway 1w from being connected in a ring form. The non-ring connection mode enables a load to be supplied with electric power from two power sources, namely, the auxiliary battery 11 and the 48V battery 21 when the load is connected to any part of the main pathway 1w.

The non-ring connection mode just needs to turn off one switch and turn on the remainder of the switches out of the first proximity switch 16n, the first remote switch 16d, the second proximity switch 26n, and the second remote switch 26d. For example, it may be favorable to turn on the three switches, namely, the first remote switch 16d, the second proximity switch 26n, and the second remote switch 26d and turn off the first proximity switch 16n.

In the non-ring connection mode, the current does not flow circularly. Therefore, it is easy to reduce generated noise more effectively than the state where the current flows circularly. The non-ring connection mode enables to suppress the noise generation and stably supply the electric loads with electric power from multiple power sources. After activating the non-ring connection mode, the process proceeds to step S111.

At step S111, the process acquires flag information. The flag information indicates whether each device of the power supply system 1 is normal. A normal flag signal is acquired if no part of the power supply system 1 malfunctions. An abnormality flag signal is acquired if any part of the power supply system 1 malfunctions. However, as a feature, it may be favorable to omit the flag signal indicating the normal state and output the abnormality flag only when an abnormality occurs.

Abnormalities to output the abnormality flag include a voltage rise due to a ground fault, disconnection, contact between the current pathways, or internal failure of the load. Abnormal parts to output the abnormality flag include the loads such as the first EPS 13 and the interior light 14, electric power supplies such as the auxiliary battery 11, and wiring to form the current pathway. Multiple abnormality flags are acquired if multiple portions malfunction.

For example, the current value measured by the first current sensor 19 or the second current sensor 29 may exceed a threshold value. Then, the abnormality flag is output based on the determination that an abnormality such as a ground fault occurs. An abnormal value may be found from the time change in the current value measured by the first current sensor 19 or the second current sensor 29. Then, the abnormality flag is output based on the determination that an abnormality such as a ground fault occurs. Instead of an ammeter, a voltmeter may be used as the first current sensor 19 or the second current sensor 29. Then, it is possible to determine the presence or absence of an abnormality based on the magnitude of the voltage or the time change in the voltage. A temperature sensor may be used to detect abnormal heat generation. Then, the abnormality flag is output based on the determination that an abnormality such as a ground fault occurs. After acquiring the flag information, the process proceeds to step S112.

At step S112, the process determines whether an abnormality flag turns on. If the abnormality flag turns on, the process determines that it is necessary to deal with the abnormality occurring in the power supply system 1. Then, the process proceeds to step S113. If no abnormality flag turns on, the process determines that the power supply system 1 functions normally. Then, the process terminates the switching control over the main switch 106.

Figure 6:
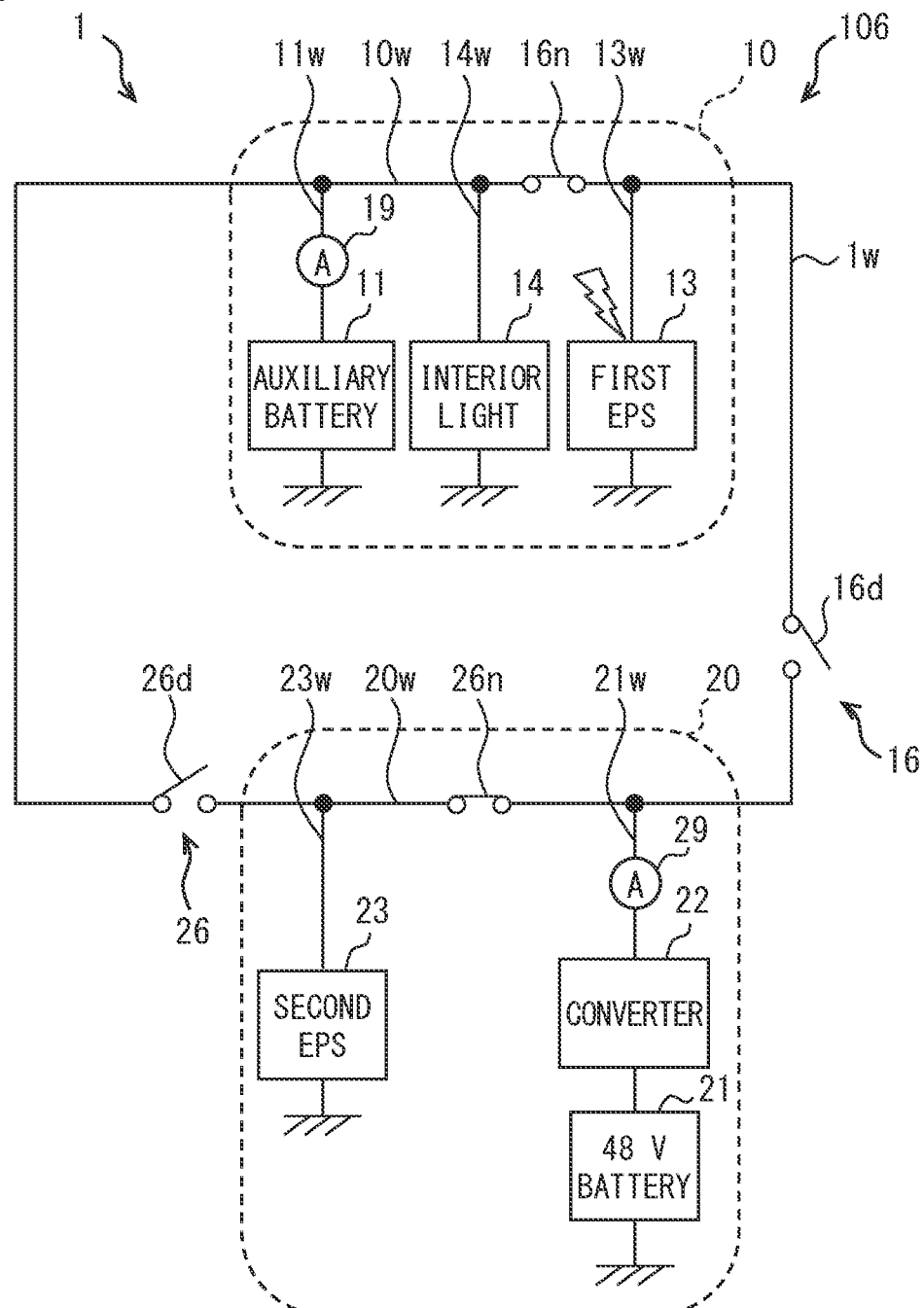
FIG. 6 is a diagram showing on/off-states of the main switches in a power system separation mode.

The description below explains the control flow of the power supply system 1 based on an example case where a ground fault occurs on the first EPS 13 in the non-ring connection mode. At step S113, a power system separation mode is activated. FIG. 6 illustrates the power supply system 1 in the power system separation mode. The power system separation mode changes the first remote switch 16d from the on-state to the off-state. The first power system 10 is separated from the second power system 20 based on the second remote switch 26d and the first remote switch 16d under the following conditions. The second remote switch 26d remains off before the power system separation mode is activated. The first remote switch 16d is changed from the on-state to the off-state as above. Therefore, the first EPS 13 is supplied with electric power only from the auxiliary battery 11. The second EPS 23 is supplied with electric power only from the 48V battery 21. In other words, the main pathway 1w is separated into two parts, namely, the part receiving electric power from the auxiliary battery 11 and the part receiving electric power from the 48V battery 21.

When the power system is separated, the electric power is not properly supplied to a malfunctioning power system. In other words, the first power system 10 includes the first EPS 13 where the ground fault occurs. A large current continues to flow from the auxiliary battery 11 to the first EPS 13 subject to the ground fault. Therefore, the electric power stored in the auxiliary battery 11 is greatly consumed to decrease the potential of the first main pathway 10w. Therefore, the electric power cannot be properly supplied to loads connected to the first power system 10.

The electric power is properly supplied to a power system free from abnormality. In other words, the second power system 20 does not include the first EPS 13 where the ground fault occurs. No current flows from the 48V battery 21 to the first EPS 13 subject to the ground fault. Therefore, the second EPS 23 connected to the second power system 20 maintains an appropriate power supply from the 48V battery 21. When the power system is separated, the second EPS 23 can properly function and provide the electric power steering function. After activating the power system separation mode, the process proceeds to step S114. At step S114, the process identifies an abnormal part. The first current sensor 19 and the second current sensor 29 are used to identify an abnormal part. First, the process identifies which of the power systems malfunctions. When the power system is separated, it is possible to determine that an abnormality occurs in the power system that causes the first current sensor 19 or the second current sensor 29 to measure an abnormal current value. It is possible to determine that no abnormality occurs in the power system that causes the first current sensor 19 or the second current sensor 29 to measure an appropriate current value. When the first EPS 13 causes a ground fault, the first current sensor 19 measures an abnormal current value. Therefore, it is possible to determine that part of the first power system 10 malfunctions.

Figure 7:
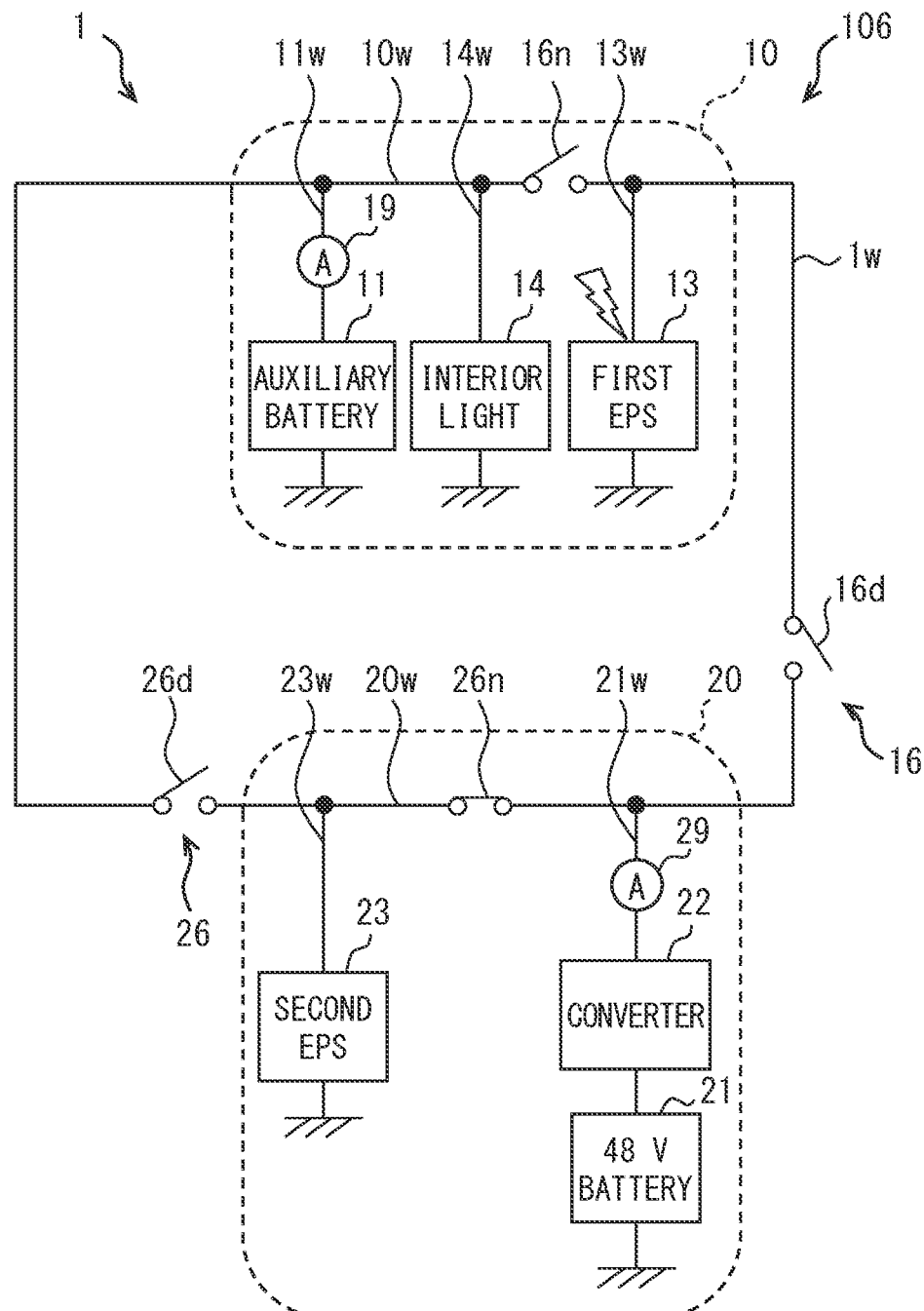
FIG. 7 is a diagram showing on/off-states of the main switches under a condition of separating an abnormal part.

Next, the process identifies an abnormal part in the first power system 10 that is determined to be abnormal. As illustrated in FIG. 7, the first proximity switch 16n is turned off while the power system remains separated. In other words, the intra-system switch is turned off in the power system that is determined to be abnormal. Then, the first main pathway 10w is separated into two current pathways. One current pathway connects with the auxiliary battery 11 and the interior light 14. The other current pathway connects with the first EPS 13. The second proximity switch 26n remains on. The second EPS 23 can be stably supplied with electric power from the 48V battery 21 even while the abnormal part is identified.

The process confirms the current value of the first current sensor 19 while the first main pathway 10w is separated into two current pathways. If the first current sensor 19 indicates an appropriate current value, it can be determined that an abnormality occurs in the part of the first main pathway 10w excluding the first current sensor 19. If the first current sensor 19 indicates an abnormal current value, it can be determined that an abnormality occurs in the part of the first main pathway 10w including the first current sensor 19. If the first EPS 13 causes a ground fault, the first current sensor 19 measures an appropriate current value. Therefore, it can be determined that an abnormality occurs on the first EPS 13 or the current pathway connected to the first EPS 13 in the first main pathway 10w. After identifying the abnormal part, the process proceeds to step S115.

At step S115, the identified abnormal part is separated from the main pathway 1w. Specifically, the switches on both sides of the part connected to the abnormal part are turned off in the main pathway 1w. When the first EPS 13 causes a ground fault, the first proximity switch 16n and the first remote switch 16d are turned off. After separating the abnormal part, the process proceeds to step S116.

Figure 8:
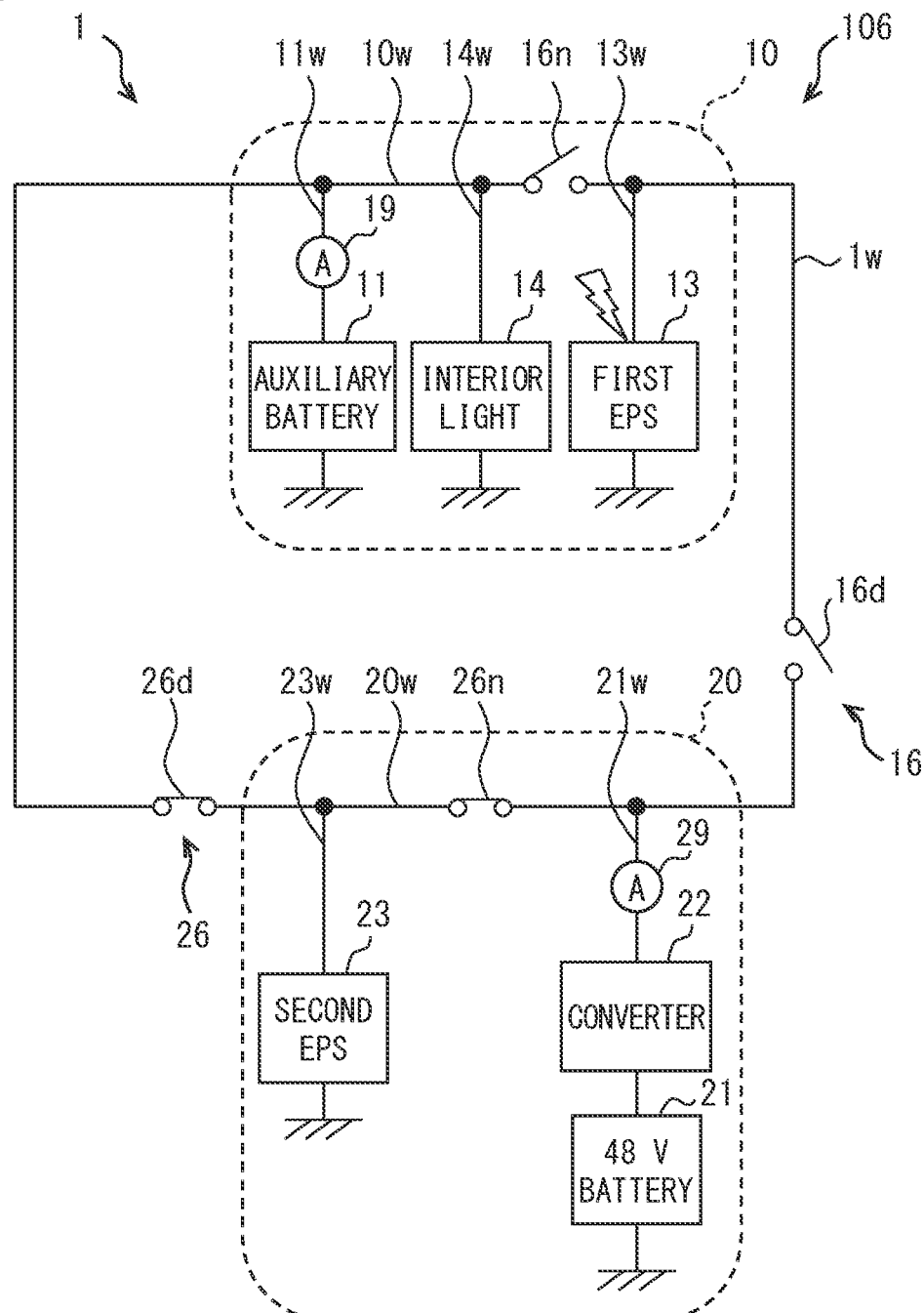
FIG. 8 is a diagram showing on/off-states of the main switches under a condition of connecting a portion other than the abnormal part.

At step S116, the process connects the current pathway except the abnormal part in the main pathway 1w. Specifically, all switches are turned on except the switch turned off to separate the abnormal part from the main pathway 1w. When the first EPS 13 causes a ground fault as illustrated in FIG. 8, the second proximity switch 26n and the second remote switch 26d are turned on. Then, the second EPS 23 can be supplied with electric power from two power sources, namely, the 48V battery 21 and the auxiliary battery 11. In other words, the second EPS 23 can be stably supplied with electric power from multiple power sources while unaffected by the ground fault. The switching control over the main switch 106 terminates after connecting the current pathway except the abnormal part. However, the control flow may be repeatedly performed until the key switch 5 turns off.

According to the above-described embodiment, the control unit 50 can activate the non-ring connection mode that turns off one of the multiple main switches 106 and turns on the remainder of the main switches 106. One of the turned-on main switches 106 can be changed to the off-state in the non-ring connection mode to separate the main pathway 1w into multiple current pathways. Therefore, it is possible to separate the main pathway 1w faster than in the case of changing two or more main switches 106 from the on-state to the off-state. Alternatively, the turned-off main switch 106 can be changed to the on-state in the non-ring connection mode to connect the main pathway 1w in a ring form. It is possible to fast switch between the ring connection mode turning on all main switches 106 and the power system separation mode turning off two or more of the main switches 106. It is possible to provide the power supply system 1 that can smoothly switch between connection states of the main pathway 1w.

It is possible to inhibit the current from circularly flowing through the main pathway 1w while maintaining the stable potential of the main pathway 1w through the use of multiple power sources such as the auxiliary battery 11 and the 48V battery 21. It is possible to stably supply electric power to the loads and suppress noise due to a current circularly flowing through the main pathway 1w at a time.

In the non-ring connection mode, the control unit 50 turns off the second remote switch 26d and turns on the first proximity switch 16n, the first remote switch 16d, and the second proximity switch 26n. In other words, the first remote switch 16d or the second remote switch 26d is turned off and the remainder of the main switches 106 are turned on. Therefore, the auxiliary battery 11 can supply electric power to the first EPS 13 via the first main pathway 10w. The 48V battery 21 can supply electric power to the second EPS 23 via the second main pathway 20w. Further, electric power is supplied between the first power system 10 and the second power system 20. The entire power supply system 1 can stably supply electric power to the first EPS 13 and the second EPS 23.

The control unit 50 activates the power system separation mode when detecting an occurrence of abnormality on the first power system 10 or the second power system 20. The power system separation mode turns off the first remote switch 16d and the second remote switch 26d and turns on the first proximity switch 16n and the second proximity switch 26n. It is possible to separate the malfunctioning power system from the power system free from abnormality. Therefore, it is possible to maintain the functions of the normal power system. In other words, it is possible to continue to drive the units such as the electric power steering systems that need to continue operating even when the power supplies are partly lost.

After activating the power system separation mode, the control unit 50 turns off the main switches 106 located at both ends of part of the main pathway 1w connected to the abnormal part and turns on the remainder of the main switches 106. It is possible to select and separate only the part close to the abnormal part instead of entirely separating the specific power system from the main pathway 1w. When the first EPS 13 causes a ground fault, the part connected to the first EPS 13 is separated from the first power system 10. It is possible to prevent a situation where the current continues flowing through the first EPS 13 until the remaining battery level of the auxiliary battery 11 becomes zero. The auxiliary battery 11 belonging to the first power system 10 can be used to supply electric power to the second EPS 23 belonging to the second power system 20. The main pathway 1w allows the parts free from abnormality to be connected. It is possible to increase the redundancy and more easily drive the power supply system 1 than a state of separating multiple power systems from each other.

The first EPS 13 connected to the first power system 10 and the second EPS 23 connected to the second power system 20 complement the electric power steering function required for the movement of movable objects. Even if one of the first EPS 13 and the second EPS 23 as loads is not properly supplied with the electric power, it is possible to easily keep the remaining load properly supplied with the electric power. It is possible to easily prevent the steering function required for vehicle travel from being completely lost compared to a case of connecting the first EPS 13 and the second EPS 23 in the same power system. Therefore, it is possible to easily maintain a state capable of vehicle travel even if the power supply system 1 malfunctions.

In the non-ring connection mode, the control unit 50 leaves the first remote switch 16d, which is capable of high cutoff response speeds among the multiple main switches 106, turned on. It is possible to fast switching of the main switches 106 by turning off the first remote switch 16d.

It is possible to fast switch from the non-ring connection mode to the power system separation mode by replacing one of the main switches 106 with a switch capable of high cutoff response speeds. The switch capable of high cutoff response speeds requires advanced noise control measures and therefore tends to be costly. It is possible to easily reduce costs of the main switches 106 compared to the use of switches capable of high cutoff response speeds for two or more main switches 106.

The control unit 50 activates the non-ring connection mode during the abnormality detection mode to detect the presence or absence of abnormalities. This makes it possible to reduce noise components attached to the current applied to detect the presence or absence of abnormalities. Therefore, it is possible to avoid a situation where a large noise is generated in the abnormality detection mode to disable accurate detection of abnormalities.

The control unit 50 activates the non-ring connection mode during the driving assistance mode or the automatic operation mode. Therefore, noise generated in the main pathway 1w can be reduced. It is possible to suppress a large noise that hinders the normal accomplishment of the electric power steering function and the perimeter monitoring function required for the driving assistance mode and the automatic operation mode. In particular, the automatic operation mode needs to fast provide complicated controls. Therefore, it is very important to activate the non-ring connection mode capable of reducing noise effects in the automatic operation mode.

The abnormality detection mode detects a ground fault. It is possible to easily inhibit a situation where a current continues flowing from the ground fault to the outside and no electric power is supplied to the first EPS 13 and the second EPS 23 as redundant traveling loads.

The main switch 106 need not be composed of four switches. The main switch 106 may be composed of two switches by providing one switch for each of the current pathways such as the first main pathway 10w and the second main pathway 20w. This makes it possible to reduce the number of switches used for the power supply system 1 and simplify the configuration of the power supply system 1 and control contents concerning the main switch 106.

If it is determined at step S101 that the non-ring connection request is not issued, the ring connection mode may be activated before proceeding to step S111. The ring connection mode turns on all the main switches 106 to connect the main pathway 1w in a ring form. It is possible to optimize the current pathway from the power supply to the load by connecting the main pathway 1w in a ring form. The ring-form main pathway 1w includes a clockwise current pathway and a counterclockwise current pathway. The current preferentially flows through the current pathway that ensures a smooth flow of current. It is possible to easily reduce an energy loss of the current flowing through the main pathway 1w compared to the non-ring connection mode. The current pathway is not immediately separated even if a disconnection occurs somewhere in the main pathway 1w. The state substantially remains the same as that activating the non-ring connection mode. Therefore, it is possible to easily maintain the state of stably supplying the loads with electric power.

If it is determined at step S112 that the abnormality flag is turned on, the user may be notified that an abnormality occurs. It is possible to provide countermeasures against abnormalities so that the user can recognize an abnormality occurrence and perform evasive travel by changing the automatic operation to the manual operation. The information to be notified preferably includes not only the presence or absence of an abnormality but also information such as types or portions of abnormalities. The user can thereby accurately determine the situation based on multiple pieces of information. The user can easily take more appropriate countermeasures.

A TOR (Take Over Request) may start if it is determined at step S112 that the abnormality flag is turned on and the automatic operation mode is activated. The TOR issues a request to transfer the driving responsibility to a driver to stop the automatic operation in the event of an abnormality. If the driver responds to the TOR, the automatic operation changes to the manual operation. If the driver does not respond to the TOR, an MRM (Minimum Risk Maneuver) starts while the automatic operation is maintained. The MRM provides operation control that allows the automatic operation to stop the vehicle in a traveling lane or near a road shoulder.

The first remote switch 16d may be provided with an automatic switch-off function instead of acquiring the flag information at step S111, determining the presence or absence of the abnormality flag at step S112, and activating the power system separation mode at step S113. The automatic switch-off function turns off switches regardless of control signals output from the control unit 50. The automatic switch-off function may be embodied by providing the first remote switch 16d with an overcurrent detection portion and automatically turning off the first remote switch 16d when the flowing current exceeds a threshold current. However, the automatic switch-off function may be embodied otherwise. For example, the overcurrent detection portion to detect an overcurrent may be replaced by a low voltage detection portion to detect a low voltage. The first remote switch 16d including the low voltage detection portion is automatically turned off when the applied voltage is lower than a threshold voltage.

In this case, it is possible to save the time for the control unit 50 to acquire the abnormality flag during the period required from the time when an abnormality occurs to the time when the power system separation mode is activated. Further, it is possible to save the time for the control unit 50 to determine the presence or absence of the abnormality flag. Moreover, it is possible to save the duration from the time when the control unit 50 outputs a signal to turn off the first remote switch 16d to the time when the first remote switch 16d receives the signal. The first remote switch 16d may be turned off faster than using the control unit 50 to turn off the first remote switch 16d.

The first remote switch 16d may be configured as a switch that can be turned off based on two methods, namely, a control signal from the control unit 50 and the overcurrent detection in the overcurrent detection portion. The first remote switch 16d including the automatic switch-off function provides a higher cutoff response speed than other switches without the automatic switch-off function.

The auxiliary battery 11 is installed toward the front and to the right of the vehicle. The 48V battery 21 and the converter 22 are installed toward the rear and to the left of the vehicle. The 48V battery 21 can reliably maintain the function as a normal power source if an external impact is applied to the front or right of the vehicle. The auxiliary battery 11 can reliably maintain the function as a normal power source if an external impact is applied to the rear or left of the vehicle. In other words, the auxiliary battery 11 and the 48V battery 21 are located to ensure the positional relationship therebetween so that both the auxiliary battery 11 and the 48V battery 21 are easily prevented from simultaneously malfunctioning even if part of the vehicle is impacted.

Second Embodiment

The present embodiment is a modification based on the preceding embodiment. The present embodiment provides the power supply system 1 with three power systems.

Figure 9:
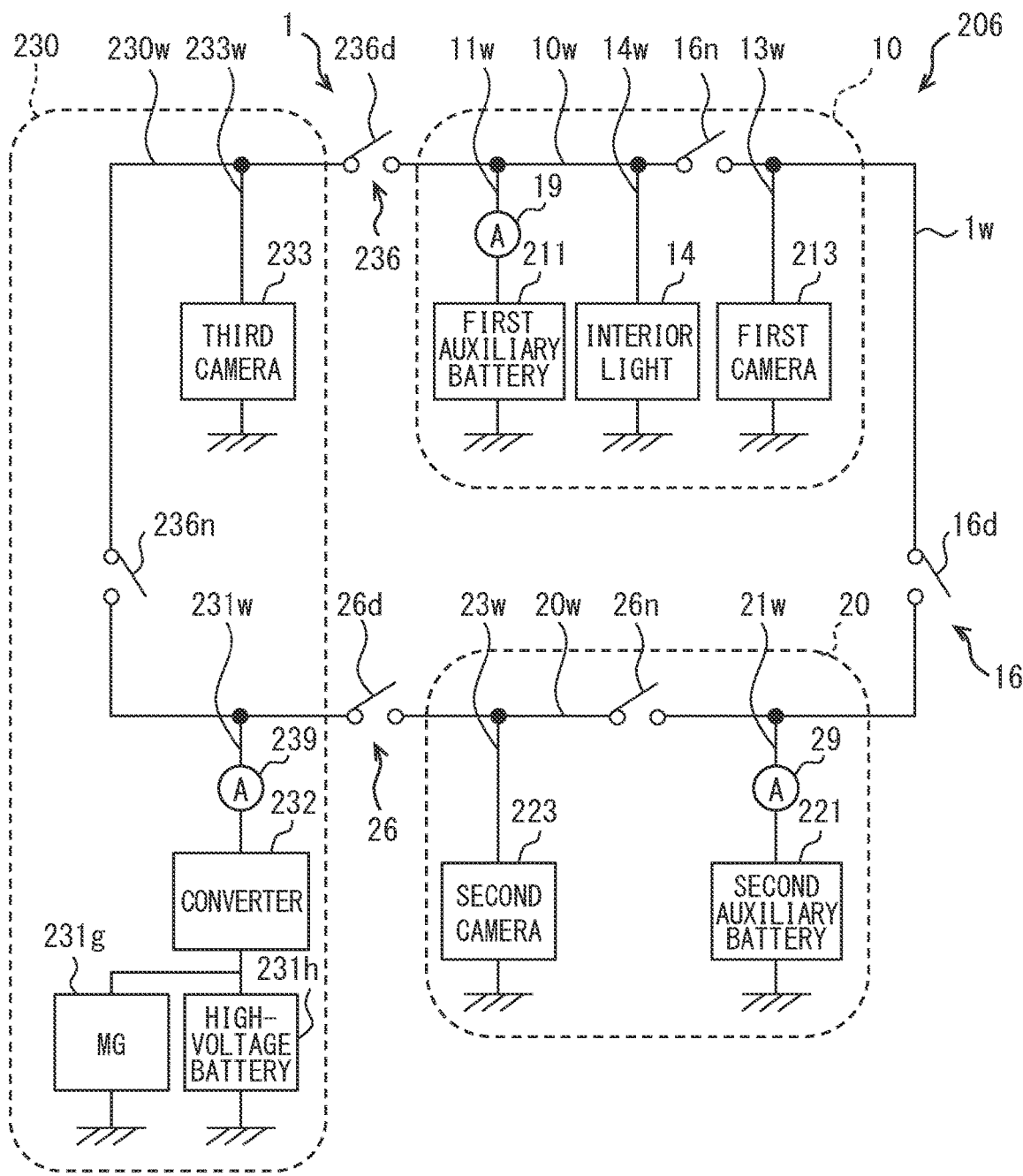
FIG. 9 is a diagram showing a schematic configuration of a power supply system according to a second embodiment.

In FIG. 9, the power supply system 1 includes four power output portions, namely, a first auxiliary battery 211, a second auxiliary battery 221, a high-voltage battery 231h, and a motor generator 231g. A motor generator 231g may be denoted as an MG 231g below. The first auxiliary battery 211, the second auxiliary battery 221, and a high-voltage battery 231h store electric power supplied to the electric loads. The first auxiliary battery 211, the second auxiliary battery 221, and the high-voltage battery 231h are DC voltage sources that can be charged and discharged. The first auxiliary battery 211 and the second auxiliary battery 221 each have a rated voltage of 12 V, for example. The first auxiliary battery 211 exemplifies a power output portion and a first power output portion. The second auxiliary battery 221 exemplifies a power output portion and a second power output portion.

The high-voltage battery 231h is installed in vehicles such as electric vehicles, hybrid vehicles, and fuel cell vehicles.

The high-voltage battery 231h stores electric power supplied to the MG 322 functioning as a traveling motor. The high-voltage battery 231h has a rated voltage of 300 V, for example. The MG 231g includes not only the function as a motor for traveling but also the function as a generator that generates electricity by using regenerative energy generated when the vehicle decelerates, for example. The MG 231g is also referred to as a rotating electrical machine. An inverter converts DC voltage from the high-voltage battery 231h into AC voltage that is supplied to the MG 231g. The high-voltage battery 231h exemplifies a power output portion. The MG 231g exemplifies a power output portion.

The first output pathway 11w is a current pathway that connects the first auxiliary battery 211 to the main pathway 1w. The first current sensor 19 measures the magnitude of current output from the first auxiliary battery 211. The second output pathway 21w is a current pathway that connects the second auxiliary battery 221 to the main pathway 1w. The second current sensor 29 measures the magnitude of current output from the second auxiliary battery 221.

The power supply system 1 includes a third output pathway 231w. The third output pathway 231w is a current pathway connected to the main pathway 1w. The third output pathway 231w connects the main pathway 1w to the high-voltage battery 231h and the MG 231g. The third output pathway 231w includes a converter 232 and a third current sensor 239. The converter 232 steps down high DC voltage output from the high-voltage battery 231h or the MG 231g to 12 V equal to the output voltage from the first auxiliary battery 211 and the second auxiliary battery 221. The third current sensor 239 measures the magnitude of current that is output from the high-voltage battery 231h or the MG 231g and is stepped down by the converter 232.

The main pathway 1w includes a third main pathway 230w. The third main pathway 230w connects the third output pathway 231w and the first output pathway 11w of the main pathway 1w.

The power supply system 1 includes a third loading pathway 233w. The first loading pathway 13w connects the main pathway 1w and a first camera 213. The second loading pathway 23w connects the main pathway 1w and a second camera 223. The third loading pathway 233w connects the main pathway 1w and a third camera 233.

The first camera 213, the second camera 223, and the third camera 233 are imaging devices for the purpose of perimeter monitoring. The first camera 213, the second camera 223, and the third camera 233 are loads that require a stable voltage supply. The first camera 213, the second camera 223, and the third camera 233 form a set of perimeter monitoring devices. Even if any one of the first camera 213, the second camera 223, and the third camera 233 malfunctions, the remainder of the cameras can function as the perimeter monitoring devices. The redundancy scheme is applied to not only the power supply path but also the loads forming the perimeter monitoring devices. Normally, all the first camera 213, the second camera 223, and the third camera 233 as loads are used to maintain favorable conditions of the perimeter monitoring performance.

All the first camera 213, the second camera 223, and the third camera 233 need not be configured as the same imaging devices. For example, the first camera 213 may be an imaging device. The second camera 223 may be a Lidar. The third camera 233 may be a millimeter-wave radar. Different devices such as the imaging device, the Lidar, and the millimeter-wave radar can be used to redundantly form the perimeter monitoring function. The first camera 213 exemplifies an electric load and a first electric load. The second camera 223 exemplifies an electric load and a second electric load. The third camera 233 exemplifies an electric load.

The third main pathway 230w includes a third main switch 236. The third main switch 236 includes two switches, namely, a third proximity switch 236n and a third remote switch 236d. The third proximity switch 236n is provided between the third output pathway 231w and the third loading pathway 233w in the third main pathway 230w. The third remote switch 236d is provided between the third loading pathway 233w and the first output pathway 11w in the third main pathway 230w. The third proximity switch 236n and the third remote switch 236d form a main switch 206. In other words, the main switch 206 is composed of six switches, namely, the first proximity switch 16n, the first remote switch 16d, the second proximity switch 26n, the second remote switch 26d, the third proximity switch 236n, and the third remote switch 236d.

When the third proximity switch 236n is turned on, electric power is supplied from the high-voltage battery 231h and the MG 231g to the third camera 233 based on the third main pathway 230w as the current pathway. When the third proximity switch 236n is turned off, no electric power is supplied from the high-voltage battery 231h and the MG 231g to the third camera 233 based on the third main pathway 230w as the current pathway. Meanwhile, the on/off-state of the third remote switch 236d does not affect the power supply from the high-voltage battery 231h or the MG 231g to the third camera 233 based on the third main pathway 230w as the current pathway.

The first auxiliary battery 211, the first camera 213, and the interior light 14 form the first power system 10. The first power system 10 encompasses a current pathway including part of the main pathway 1w, the first output pathway 11w, the first loading pathway 13w, and the general loading pathway 14w. The first power system 10 can supply electric power to the first camera 213 by using the first auxiliary battery 211.

The second auxiliary battery 221 and the second camera 223 form the second power system 20. The second power system 20 encompasses a current pathway including part of the main pathway 1w, the second output pathway 21w, and the second loading pathway 23w. The second power system 20 can supply electric power to the second camera 223 by using the second auxiliary battery 221.

The high-voltage battery 231h, the MG 231g, and the third camera 233 form a third power system 230. The third power system 230 encompasses a current pathway including part of the main pathway 1w, the third output pathway 231w, and the third loading pathway 233w. The third power system 230 can supply electric power to the third camera 233 by using the high-voltage battery 231h or the MG 231g.

When the third remote switch 236d is turned on, electric power is supplied from the first auxiliary battery 211 to the third camera 233 based on the third main pathway 230w as the current pathway. When the third remote switch 236d is turned off, no electric power is supplied from the first auxiliary battery 211 to the third camera 233 based on the third main pathway 230w as the current pathway.

The third remote switch 236d is an inter-system switch that switches connection states between different power systems such as the first power system 10 and the third power system 230. The third proximity switch 236n is an intra-system switch that switches connection states in one power system. In other words, the third remote switch 236d is an inter-system switch that is turned on to cause a conductive state between adjacent power systems and is turned off to cause a disconnective state between the power systems. The third proximity switch 236n is an intra-system switch that is turned on to cause a conductive state in the third power system 230 and is turned off to cause a disconnective state in the third power system 230.

The non-ring connection mode turns off only one of the main switches 206 provided for the main pathway 1w and turns on the remainder of the switches. For example, the second remote switch 26d is turned off. The first proximity switch 16n, the first remote switch 16d, the second proximity switch 26n, the third proximity switch 236n, and the third remote switch 236d are turned on. Consequently, the main pathway 1w is not connected in a ring form at one portion, namely, the second remote switch 26d.

The power system separation mode turns off all the inter-system switches and turns on all the intra-system switches. In other words, the first remote switch 16d, the second remote switch 26d, and the third remote switch 236d are turned off. The first proximity switch 16n, the second proximity switch 26n, and the third proximity switch 236n are turned on. The consequence is to mutually separate different power systems such as the first power system 10, the second power system 20, and the third power system 230.

The above-described embodiment can maintain the stable potential of the main pathway 1w and inhibit the current from circularly flowing through the main pathway 1w at a time based on the power supply from four power sources such as the first auxiliary battery 211, the second auxiliary battery 221, the high-voltage battery 231h, and the MG 231g.

The first camera 213, the second camera 223, and the third camera 233 complement the perimeter monitoring function required for the movement of movable objects. In other words, the first camera 213, the second camera 223, and the third camera 233 are redundant traveling loads. Even if one of the first camera 213, the second camera 223, and the third camera 233 as loads is not properly supplied with the electric power, it is possible to easily keep the remaining loads properly supplied with the electric power. It is possible to prevent the perimeter monitoring function required for vehicle travel from being completely lost. Even if the power supply system 1 malfunctions, it is possible to easily maintain a state capable of vehicle travel by retaining automatic operation or drive assist.

The third proximity switch 236n and the third remote switch 236d may be considered as inter-system switches. In this case, the third proximity switch 236n and the third remote switch 236d form inter-system switches that switch between the conductive and disconnective states between the first power system 10 and the second power system 20.

The third power system 230 may be treated as part of the first power system 10. Alternatively, the third power system 230 may be treated as part of the second power system 20. In other words, one power system may include multiple power output portions via the main switch 206. When the third power system 230 is treated as part of the first power system 10, the first proximity switch 16n, the third proximity switch 236n, and the third remote switch 236d may be regarded as intra-system switches in the first power system 10. When the third power system 230 is treated as part of the second power system 20, the second proximity switch 26n, the second remote switch 26d, and the third proximity switch 236n may be regarded as intra-system switches in the second power system 20. In this case, the third remote switch 236d may be regarded as an inter-system switch provided between the first power system 10 and the second power system 20.

The power supply system 1 is not limited to including two or three power systems. The power supply system 1 may include four or more power systems.

One power system is not limited to including one loading pathway. For example, the first power system 10 may include multiple first loading pathways 13w to supply electric power to each of the first EPS 13 and the first camera 213.

Third Embodiment

The present embodiment is a modification based on the preceding embodiments. According to the present embodiment, a bypass pathway 302w is connected to the ring-form main pathway 1w.

Figure 10:
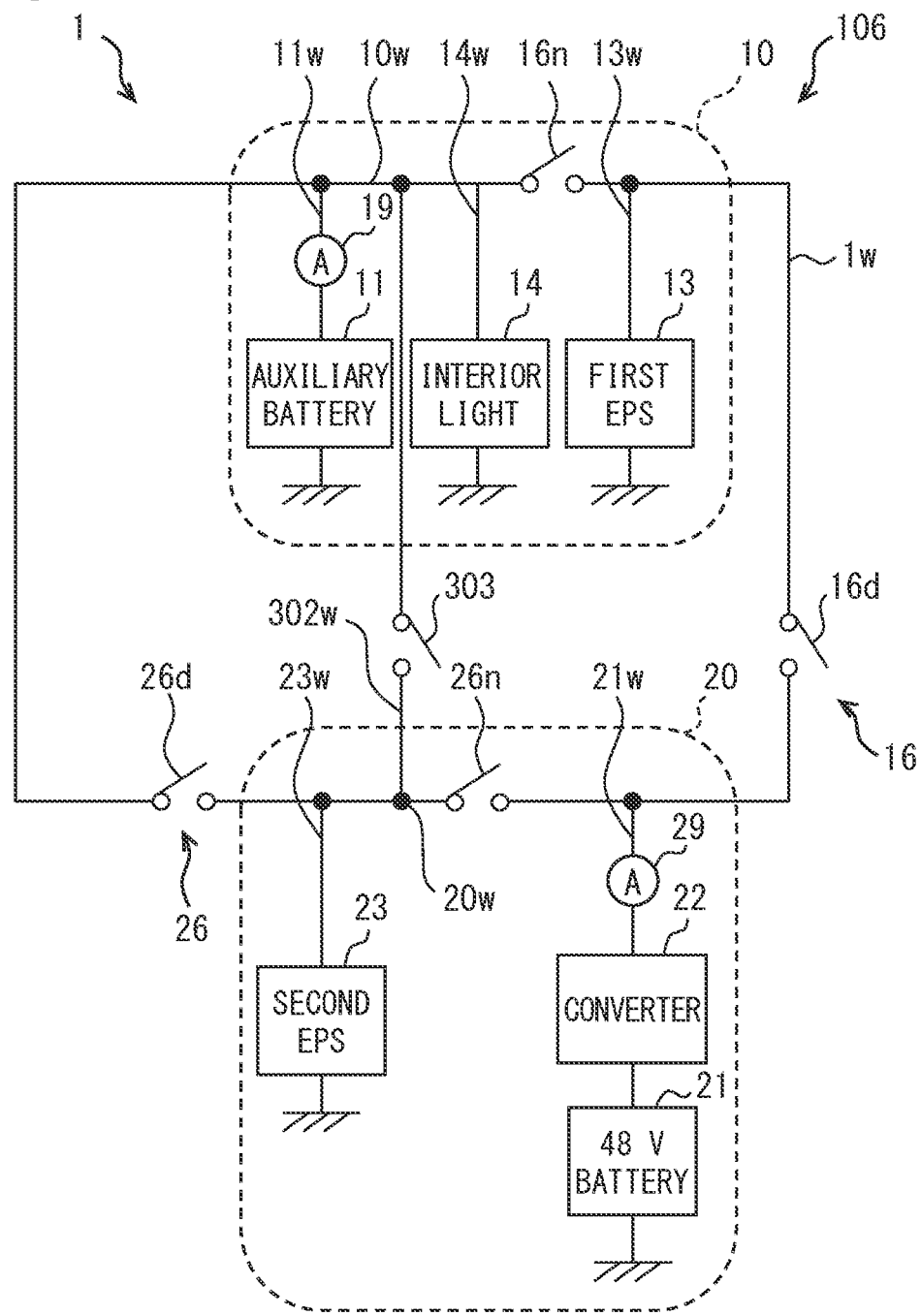
FIG. 10 is a diagram showing a schematic configuration of a power supply system according to a third embodiment.

In FIG. 10, one end of the bypass pathway 302w is connected between the first output pathway 11w and the first loading pathway 13w of the first main pathway 10w. The other end of the bypass pathway 302w is connected between the second output pathway 21w and the second loading pathway 23w of the second main pathway 20w. The bypass pathway 302w connects the first power system 10 and the second power system 20.

The bypass pathway 302w includes a bypass switch 303. When the bypass switch 303 is turned on, the bypass pathway 302w is conductive. When the bypass switch 303 is turned off, the bypass pathway 302w is disconnective.

When the bypass switch 303 is turned on in the ring connection mode, the current output from auxiliary battery 11 can flow through three current pathways. The three current pathways include the one passing through the first main pathway 10w, the one passing through the second main pathway 20w, and the one passing through the bypass pathway 302w. The bypass switch 303 is turned off in the non-ring connection mode and the power system separation mode.

The above-described embodiment includes the bypass pathway 302w and the bypass switch 303. When the bypass switch 303 is turned on to make the bypass pathway 302w conductive, the electric power may be able to be supplied to the loads through a current pathway shorter than the first main pathway 10w or the second main pathway 20w. In other words, the current can flow through the optimum current pathway selected from the three current pathways such as the first main pathway 10w, the second main pathway 20w, and the bypass pathway 302w according to efficiencies of the current flow. It is possible to shorten the current pathway for the power supply. Therefore, it is possible to easily reduce the electrical resistance of the current pathway and provide a relatively lossless power supply.

In the non-ring connection mode or the power system separation mode, the bypass switch 303 can be turned off to disconnect the bypass pathway 302w. Therefore, it is possible to avoid a situation where a current flows through the bypass pathway 302w to prevent the non-ring connection mode or the power system separation mode from being activated properly.

Other Embodiments

The disclosure of this specification and drawings, for example, is not limited to the described embodiments. The disclosure includes the described embodiments and modified forms provided by those skilled in the art based on the embodiments. For example, the disclosure is not limited to combinations of the parts and/or elements described in the embodiments. The disclosure is available in various combinations. The disclosure may include an additional part that may be added to the embodiments. The disclosure encompasses an embodiment that is devoid of the parts and/or elements of the embodiments. The disclosure includes a replacement or a combination of the parts and/or elements between one embodiment and another embodiment. The disclosed technical scope is not limited to the description of the embodiments. Some of the disclosed technical scopes need to be understood to be available in the description of the claims and to encompass all changes in the meaning and the scope comparable to the description of the claims.

The description of the claims does not limit the disclosure of the specification and drawings, for example. The disclosure of the specification and drawings, for example, encompasses the technical ideas described in the claims and further covers a wider variety of technical ideas than the technical ideas described in the claims. Therefore, various technical ideas may be extracted from the disclosure of the specification and drawings, for example, without being limited by the description of the claims.

What is claimed is:

1. A power supply system comprising:
a first power output portion configured to output electric power supplied to an electric load;
a second power output portion different from the first power output portion and configured to output electric power supplied to the electric load;
a main pathway in a ring form and configured to provide a current pathway to enable flow of a current output from the first power output portion and a current output from the second power output portion;
a first output pathway connecting the main pathway with the first power output portion;
a second output pathway connecting the main pathway with the second power output portion;
a loading pathway connecting the main pathway with the electric load;
a plurality of main switches provided to the main pathway and configured to switch between a state, in which the main pathway is connected in the ring form, and a state, in which the main pathway is not connected in the ring form; and
a control unit configured to control switching of the main switches, wherein:
the control unit is configured to activate a non-ring connection mode that turns off one of the main switches and turns on a remainder of the main switches,
the main pathway includes
a first main pathway configured to connect the first output pathway with the second output pathway and
a second main pathway different from the first main pathway and configured to connect the first output pathway with the second output pathway, the loading pathway includes
a first loading pathway connected to the first main pathway and
a second loading pathway connected to the second main pathway, the main switch includes
a first proximity switch provided between the first output pathway and the first loading pathway in the first main pathway, a first remote switch provided between the first loading pathway and the second output pathway in the first main pathway, a second proximity switch provided between the second output pathway and the second loading pathway in the second main pathway, and a second remote switch provided between the second loading pathway and the first output pathway in the second main pathway, and in the non-ring connection mode, the control unit is configured to turn off one of the first remote switch and the second remote switch and turn on a remainder of the main switches.

2. The power supply system according to claim 1, wherein when detecting a malfunction in a power system, the control unit is configured to activate a power system separation mode that turns off the first remote switch and the second remote switch and turns on the first proximity switch and the second proximity switch.

3. The power supply system according to claim 2, wherein after activating the power system separation mode, the control unit is configured to turn off main switches of the main switches at both ends of a part connected to a malfunctioning portion in the main pathway and turn on a remainder of the main switches.

4. The power supply system mounted on a movable object according to claim 1, further comprising:

a first electric load connected to, as the electric load, the first loading pathway; and a second electric load connected to, as the electric load, the second loading pathway, wherein the first electric load and the second electric load are configured to mutually complement a function required for movement of the movable object.

5. The power supply system according to claim 1, wherein the control unit is configured to activate the non-ring connection mode during an abnormality detection mode that detects presence or absence of an abnormality.

6. A power supply system comprising:

a first power output portion configured to output electric power supplied to an electric load;

a second power output portion different from the first power output portion and configured to output electric power supplied to the electric load;

a main pathway in a ring form and configured to provide a current pathway to enable flow of a current output from the first power output portion and a current output from the second power output portion;

a first output pathway connecting the main pathway with the first power output portion;

a second output pathway connecting the main pathway with the second power output portion;

a loading pathway connecting the main pathway with the electric load;

a plurality of main switches provided to the main pathway and configured to switch between a state, in which the main pathway is connected in the ring form, and a state, in which the main pathway is not connected in the ring form; and a control unit configured to control switching of the main switches, wherein:

the control unit is configured to activate a non-ring connection mode that turns off one of the main switches and turns on a remainder of the main switches, one of the main switches is configured to provide higher cutoff response speed than an other of the main switches, and in the non-ring connection mode, the control unit is configured to cause the one of the main switches that provides higher cutoff response speed to remain turned on.

7. The power supply system according to claim 6, wherein each of the main switches is configured to be turned on and turned off.

8. A power supply system comprising:

a first power output portion configured to output electric power supplied to an electric load;

a second power output portion different from the first power output portion and configured to output electric power supplied to the electric load;

a main pathway in a ring form and configured to provide a current pathway to enable flow of a current output from the first power output portion and a current output from the second power output portion;

a first output pathway connecting the main pathway with the first power output portion;

a second output pathway connecting the main pathway with the second power output portion;

a loading pathway connecting the main pathway with the electric load;

a plurality of main switches provided to the main pathway and configured to switch between a state, in which the main pathway is connected in the ring form, and a state, in which the main pathway is not connected in the ring form; and a control unit configured to control switching of the main switches, wherein:

the control unit is configured to activate a non-ring connection mode that turns off one of the main switches and turns on a remainder of the main switches, and the control unit is configured to activate the non-ring connection mode during a driving assistance mode or an automatic operation mode.

* * * * *